(12) United States Patent
Griffen

(10) Patent No.: US 7,153,063 B2
(45) Date of Patent: Dec. 26, 2006

(54) PORTABLE AND ADJUSTABLE BOAT DOCK BUMPER ASSEMBLY

(76) Inventor: Scott Richard Griffen, 126 Orchard Dr., Cedar Falls, IA (US) 50613

( * ) Notice: Subject to any disclaimer, the term of this patent is extended or adjusted under 35 U.S.C. 154(b) by 113 days.

(21) Appl. No.: 11/162,710

(22) Filed: Sep. 20, 2005

(65) Prior Publication Data
US 2006/0182501 A1 Aug. 17, 2006

Related U.S. Application Data

(60) Provisional application No. 60/612,034, filed on Sep. 22, 2004.

(51) Int. Cl.
*E02B 3/26* (2006.01)
(52) U.S. Cl. ........................ 405/215; 405/212; 114/219
(58) Field of Classification Search ........ 405/212–215; 114/219, 220; 14/76
See application file for complete search history.

(56) References Cited

U.S. PATENT DOCUMENTS

| | | | |
|---|---|---|---|
| 2,815,778 A * | 12/1957 | Holman | |
| 3,464,214 A * | 9/1969 | King | 405/214 |
| 4,773,349 A * | 9/1988 | McKinney | |
| 5,037,242 A * | 8/1991 | Nill | |
| 5,740,752 A * | 4/1998 | Allenbaugh | 114/219 |
| 5,762,016 A * | 6/1998 | Parsons | |
| 6,327,989 B1 * | 12/2001 | Beach | 405/212 |
| 6,513,449 B1 * | 2/2003 | Stewart et al. | 405/212 |
| 6,536,992 B1 * | 3/2003 | Floe | 405/218 |
| 6,619,222 B1 * | 9/2003 | Clary | 114/219 |
| 6,823,811 B1 * | 11/2004 | Drake | 405/212 |

* cited by examiner

*Primary Examiner*—Frederick L. Lagman
(74) *Attorney, Agent, or Firm*—James C. Nemmers

(57) ABSTRACT

A boat docket bumper assembly designed to be clamped to a boat dock to protect a boat from coming in direct contact with the dock. The boat dock bumper assembly includes a vertical support to one side of which a bumper can be attached. The assembly has a mounting member that when combined with suitable clamps, provides for attachment of the assembly to the edge of a dock regardless of its height. The vertical support may include a plurality of holes which provide for adjustability of the height of the bumper or it may include slots with adjustable tie bars to which the bumper can be attached.

7 Claims, 5 Drawing Sheets

PORTABLE AND ADJUSTABLE BOAT DOCK BUMPER ASSEMBLY

This application claims the benefit of provisional patent application No. 60/612,034 filed Sep. 22, 2004.

BACKGROUND OF THE INVENTION

This invention relates to boat dock bumpers, and more particularly to a portable and adjustable boat dock bumper attachable to the boat dock.

It is well known that it is desirable to bumper the impact between a boat and a boat dock or piling since such impacts can cause damage to the boat hull and boat gunnels. These impacts occur as a normal result of docking a boat or while a boat is secured to a boat dock and is subject to waves that can cause the boat to be moved against the dock. The prior art discloses a variety of devices that include bumpers permanently mounted along the edges or posts of a boat docket as well as cushioning fenders that typically are secured either to the boat or boat dock edge by ropes or cords. Although bumpers permanently mounted along the edge of a boat dock can minimize the problem of damage to a boat, the spacing of the bumpers may not be sufficient to fully protect the boat. Also, the boater usually has no control over the cushioning, if any, on different docks that may be utilized by the boater. Of course, if the boater has an assigned docket space that is either owned or rented by the boater, the boater can install or mount appropriate and proper bumpers on the dock edges. However, these obviously provide no protection when the boater utilizes other docks. The typical boat fenders that are attached to the boat with rope and swung inside the boat when not in use at the dock can be loosened by wind or storms that occur while the boat is docked and the owner is not present. Moreover, when not in use and are stored inside the boat, the fenders take up valuable space that could be used for storage of other articles or simply to provide additional space for comfort of the occupants of the boat.

There is therefore a need for an improved boat dock bumper that can be adjusted to any boat length and gunwale height, therefore enabling the boater to place the bumpers strategically so as to protect the boat in the most likely area where the boat will come in contact with the dock. There is also a need for such adjustable type boat dock bumpers that can be easily moved from side to side and in varying heights along a dock. The bumpers should also be portable so that they can be carried in the boat and temporarily mounted on a dock or they can be mounted semi-permanently or permanently, if desired, on the boater's owned dock.

SUMMARY OF THE INVENTION

The boat docket bumper of the invention is an assembly designed to be clamped in at least pairs to a boat dock, thus enabling the user to strategically place the bumpers and thereby protect the boat in the most likely area that the boat will come in contact with the dock. The boat dock bumper assembly includes a vertical support to one side of which a cushion or bumper can be attached. The assembly also has a mounting member that when combined with suitable clamps provides for attachment of the assembly to the dock. The vertical support may include a plurality of holes which provide for adjustability of the height of the bumper or the vertical support may include slots with adjustable tie bars to which the bumper may be attached.

DESCRIPTION OF THE PREFERRED EMBODIMENT OF THE INVENTION

Figure 1:
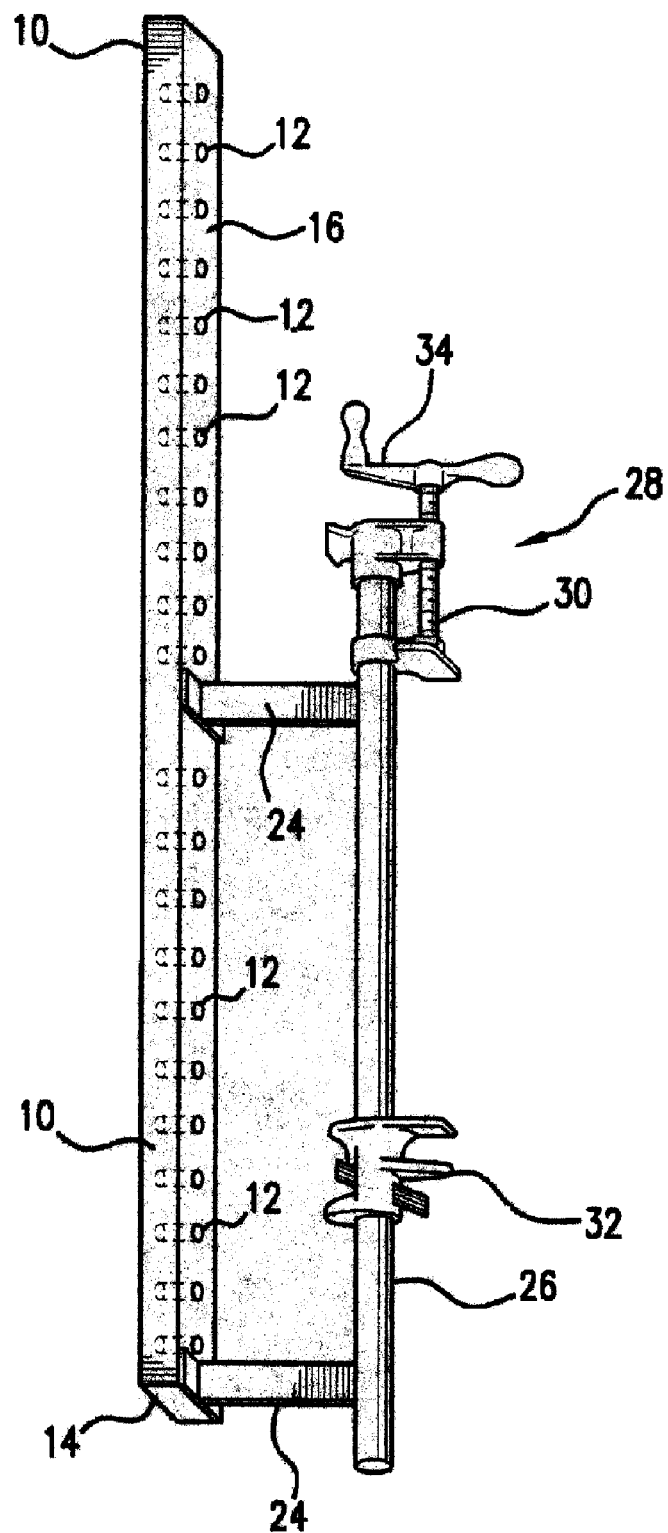
FIG. 1 is a perspective view of the adjustable boat dock bumper assembly of the invention and showing the boat bumper removed.
Figure 2:
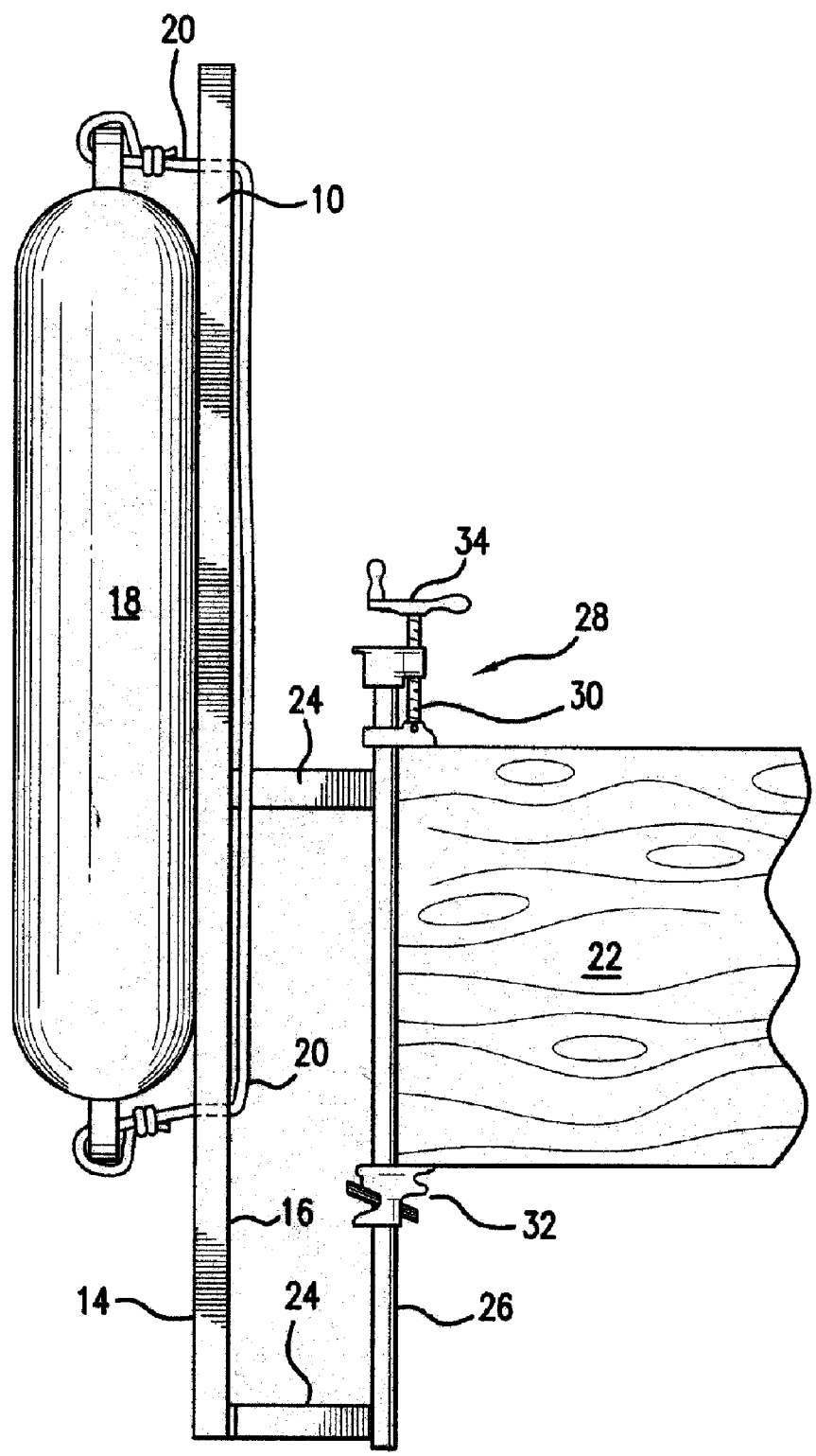
FIG. 2 is a side view of the boat dock bumper of FIG. 1 and showing a bumper attached and the complete bumper assembly attached to a dock.

Referring first to FIGS. 1 and 2, there is illustrated the adjustable and portable boat dock bumper assembly of the invention which includes a vertical upright bumper support 10 having a plurality of openings 12 extending through it from side to side at spaced intervals as best seen in FIG. 1. The upright support 10 can be made of wood, plastic, metal, or any other suitable material that will not easily corrode since the assembly of the invention will be exposed to water, including possibly salt water. The upright support 10 has a front side 14 and a rear side 16. The front side 14 may have a rubber or rubber-like material (not shown) bonded to it along its entire length to serve as a bumper. In this event, the openings 12 are not necessary. The openings 12 are used for attaching a pre-fabricated cylindrical bumper typically made of some form of plastic or it can be inflatable. These bumpers are well known to those familiar with the art. A typical such bumper 18 is shown in FIG. 2 lying against the front side 14 with the bumper 18 being attached using a flexible ties such as ropes 20 threaded through one or more of the openings 12. Because a plurality of spaced apart openings 12 are provided in the upright support 10, the vertical position of the bumper 18 may be adjusted for the proper height to protect the gunwale of the boat sitting in the water adjacent the dock 22. In order to attach the assembly of the invention to the dock 22, support arms 24 are affixed to the rear side 16 of the upright support 10, and the arms 24 extend rearwardly and are affixed to a vertical dock mounting member 26. An adjustable clamp assembly 28 is slideably mounted on the mounting member 26 so that the assembly of the invention can be quickly and simply secured to the dock 22. The clamp assembly 28 is of any suitable design well known to those skilled in the art and consists of an upper clamp 30 and a lower clamp 32 which are moveable toward and away from each other so that the bumper assembly can be adjusted to fit docks of different heights. Once the upper clamp 30 and lower clamp 32 are properly positioned on the mounting member 26 relative to the dock 22, and with the lower clamp 32 secured to the mounting member 26, the clamp assembly 28 is tightened by turning the handle 34 to lock the clamp assembly 28 in place. FIG. 2 shows the bumper assembly of the invention mounted on the dock 22 with the bumper 18 tied in place on the vertical support 10. Preferably, two or more of these boat dock bumper assemblies of the invention should be used, with one mounted to the dock near the bow end of the boat and one mounted on the dock near the stern end of the boat. The ability of being able to place the bumper assemblies of the invention at selected distances apart from each other so that they will best contact the boat in the areas where it will first come in contact with the docks edge is a definite advantage. In addition, as previously noted, the bumper assembly of the invention provides for adjustability of the height of the boat bumpers to adapt to the difference in height of the gunwales from bow to stern as the boat sits in the water.

Figure 3:
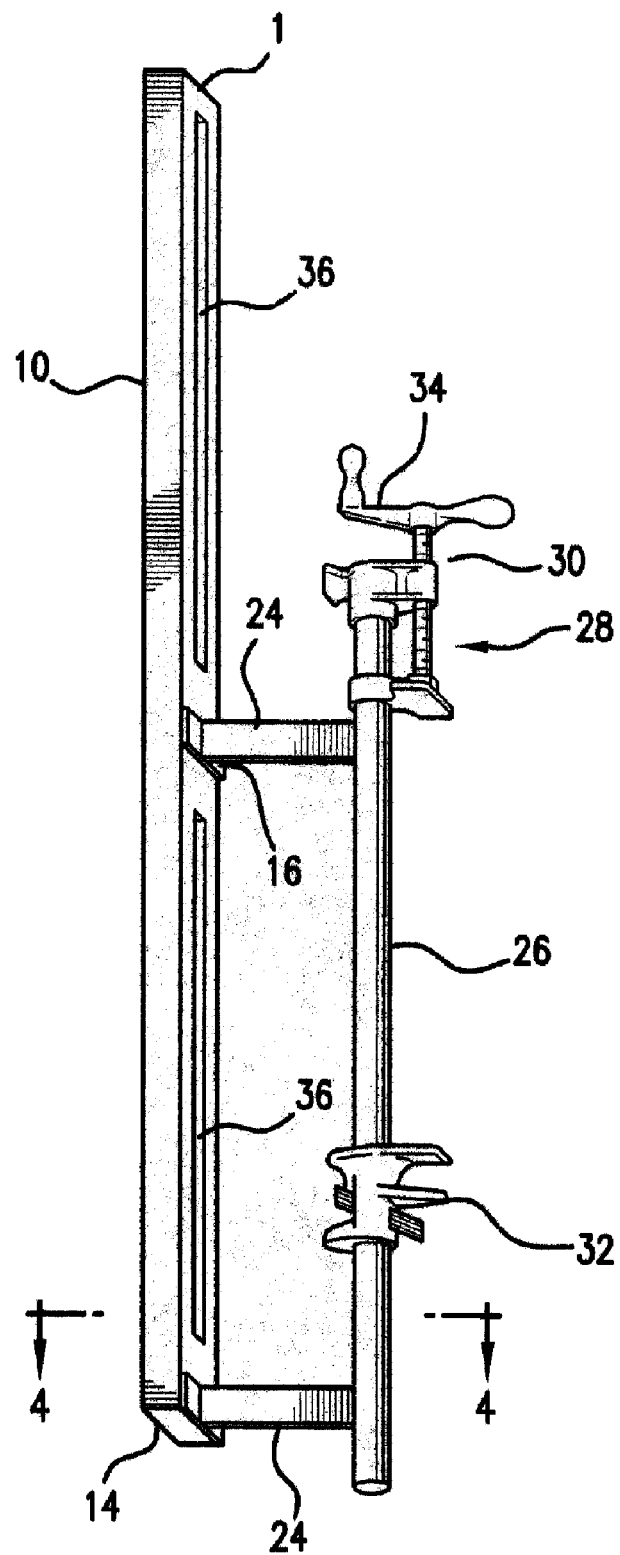
FIG. 3 is a perspective view of a second embodiment of the invention.
Figure 4:
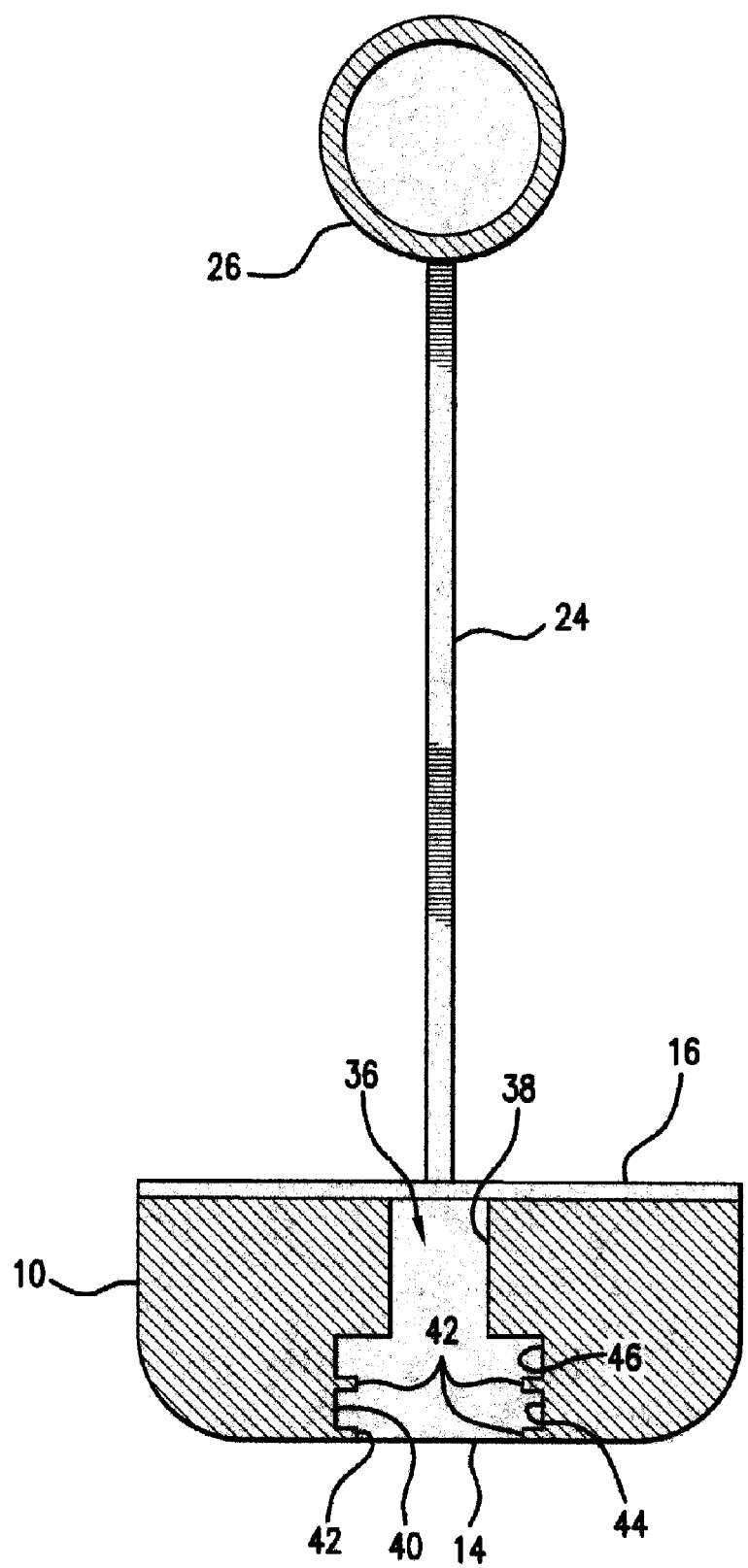
FIG. 4 is a sectional view taken on the line 4—4 of FIG. 3.
Figure 5:
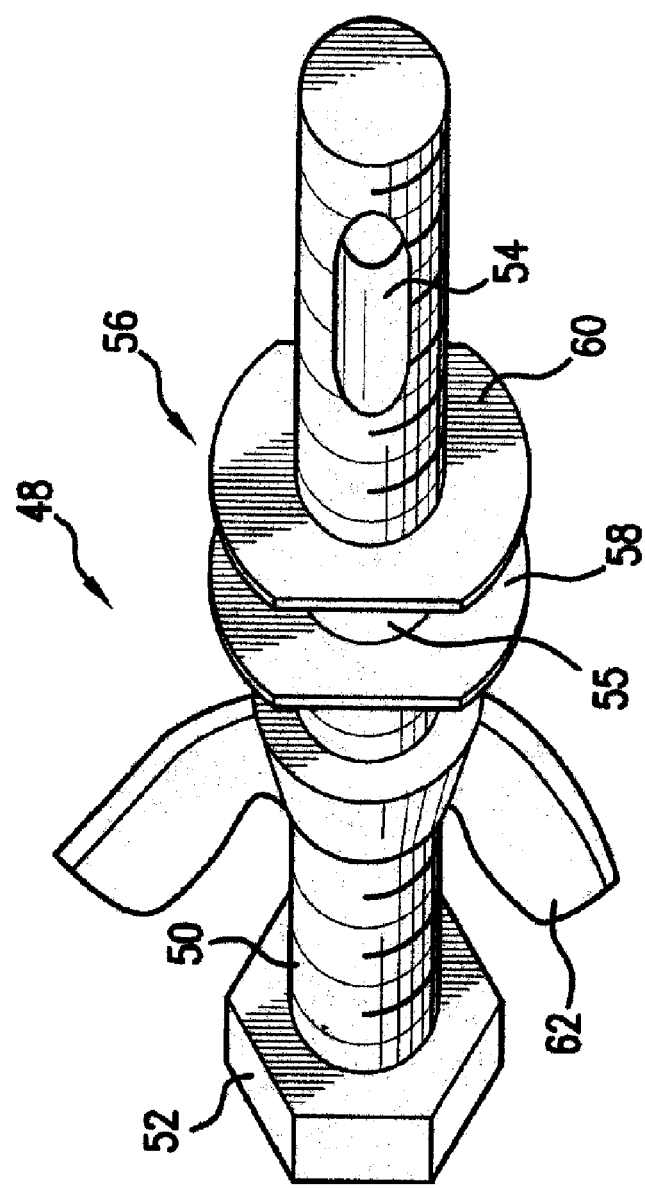
FIG. 5 is a perspective view of the adjustable attachment mechanism for anchoring the bumper to the bumper assembly.

Referring now to FIGS. 3, 4 and 5, there is shown another embodiment of the invention. In this second embodiment, the vertical upright support 10 is provided with one or more elongated openings or slots 36. FIG. 3 shows a pair of vertically aligned, elongated slots 36. Similar to the first embodiment, the vertical mounting member 26 carrying the clamp assembly 28 is secured in any suitable manner to the rear side 16 of the upright support 10 by rearwardly extending support arms 24. As described in connection with the first embodiment, the clamp assembly 28 includes an upper clamp 30 and a lower clamp 32.

To provide for adjustability of the height of a boat fender or bumper 18, each of the elongated slots 36 is formed with a narrow diameter 38 and a wide diameter 40 (see FIG. 4). Extending inwardly along each side of the wide diameter 40 are a pair of ribs 42 that form adjacent vertical grooves 44 and 46. FIG. 5 shows the bumper attaching device 48 which provides for attachment of the boat bumpers 18 to the bumper assembly. The attaching device 48 is comprised of a threaded member 50 containing a hex head 52 at one end and an attachment opening 54 at the opposite end. An internally threaded spool 56 contains a central section 55 containing threads that match the threads on the threaded member 50. The central section 55 of spool 56 is joined to and separates two spaced apart flanges 58 and 60 that have flattened vertical edges with the width between opposite edges of each flange being slightly less than the wide diameter 40 of the elongated slots 36. The spool 56 is preferably formed of one piece, and thus, a spool 56 can be positioned in each of the elongated slots 36 with the flanges 58 and 60 being received in the grooves 44 and 46. An adjustable locking wing nut 62 is threaded onto the member 50 between the spool 56 and hex head 52.

To use the bumper assembly of this second embodiment, the wing nut 62 is threaded onto threaded member 50. With a spool 56 positioned in each one of the elongated slots 36 so that the flanges 58 and 60 are received in the grooves 44 and 46, the member 50 is threaded into the spool 56 until the attachment opening 54 is positioned the desired distance from the front side 14 of the upright support 10. At this time, the wing nut 62 is tightened against the rear side 16 of the upright support to lock the position of the attaching device 48 in place at the desired height. Obviously, the attaching device 48 can be adjusted upwardly and downwardly in slot 36 to the desired height suitable for attaching the bumper 18. With an attaching device 48 mounted at the desired position in each of the slots 36, the attachment opening 54 in each device 48 is then used to tie the bumper 18 in place.

It will be evident from the foregoing description that I have provided an adjustable and portable boat bumper assembly for properly positioning boat fenders or bumpers in place. The assembly of the invention is fully portable so that it can be moved from dock to dock and can be positioned on a dock in multiples to fit all lengths of boats. In addition, the height of the position of the boat bumper or fender can be adjusted which is extremely important because the gunwale edge varies from boat manufacturer to boat manufacturer, and the boat fenders or bumpers must be strategically positioned along a dock at proper spacing and proper height to meet the area of the boat that best protects it from damage.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is:

1. A boat dock bumper assembly providing for the mounting of an elongated bumper in a vertical position to a generally horizontal boat dock to protect a boat from damage when secured to the dock, said assembly comprising:
   a vertical bumper support having a front side and a rear side with one or more openings extending through the support from the front side to the rear side;
   a dock mounting member spaced rearwardly from the vertical support to provide for securing the assembly to a boat dock, the dock mounting member being a vertical member spaced from the rear side of the vertical bumper member;
   a clamp assembly operatively combined with the dock mounting member for adjustably mounting the assembly to the horizontal dock in a selected vertical position; and
   a flexible tie combined with the bumper support and extending through the selected openings in the support to provide for attachment of an elongated bumper to the bumper assembly in a vertical position at the desired height.

2. The boat dock bumper assembly of claim 1 in which the dock mounting member is a vertical member spaced from the rear side of the vertical bumper member.

3. A boat dock bumper assembly providing for the mounting of a bumper to a boat dock to protect a boat from damage when secured to the dock, said assembly comprising:
   a vertical bumper support having a front side and a rear side with one or more openings extending through the support from the front side to the rear side;
   a dock mounting member spaced rearwardly from the vertical support to provide for securing the assembly to a boat dock, the dock mounting member being a vertical member spaced from the rear side of the vertical bumper member;
   a clamp assembly operatively combined with the dock mounting member for adjustably mounting the assembly to the dock in a selected vertical position;
   the clamp assembly being comprised of a two part clamp slidably mounted on the vertical dock mounting member, the two parts of the clamp assembly being adapted to be secured to the dock mounting member at the desired spacing to mount the boat dock bumper assembly to the dock; and
   a flexible tie combined with the bumper support and extending through the selected openings in the support to provide for attachment of a bumper to the bumper assembly at the desired height.

4. A boat dock bumper assembly providing for the mounting of a bumper to a boat dock to protect a boat from damage when secured to the dock, said assembly comprising:
   a vertical bumper support having a front side and a rear side with one or more openings extending through the support from the front side to the rear side;
   a dock mounting member spaced rearwardly from the vertical support to provide for securing the assembly to a boat dock, the dock mounting member being a vertical member spaced from the rear side of the vertical bumper member;

a clamp assembly operatively combined with the dock mounting member for adjustably mounting the assembly to the dock in a selected vertical position;

a flexible tie combined with the bumper support and extending through the selected openings in the support to provide for attachment of a bumper to the bumper assembly at the desired height; and the one or more openings in the vertical bumper support being comprised up a plurality of spaced-apart holes, each one being adapted to receive a flexible tie whereby the position of a bumper secured to the bumper support can be adjusted to the desired height.

5. A boat dock bumper assembly providing for the mounting of a bumper to a boat dock to protect a boat from damage when secured to the dock, said assembly comprising:

a vertical bumper support having a front side and a rear side with one or more openings extending through the support from the front side to the rear side, the one or more openings in the vertical bumper support being vertically elongated slots;

a dock mounting member spaced rearwardly from the vertical support to provide for securing the assembly to a boat dock, the dock mounting member being a vertical member spaced from the rear side of the vertical bumper member;

a clamp assembly operatively combined with the dock mounting member for adjustably mounting the assembly to the dock in a selected vertical position; and a flexible tie combined with the bumper support and extending through the selected openings in the support to provide for attachment of a bumper to the bumper assembly at the desired height.

6. The boat dock bumper assembly of claim 5 in which a bumper attaching device is combined with and movable along each slot, the bumper attaching device being adapted to be locked in a selected position to receive a flexible tie for attachment of a bumper to the bumper assembly.

7. The boat dock bumper assembly of claim 6 in which each slot is formed with a first diameter and a second diameter that is wider than the first diameter, a pair of ribs extend inwardly along the length of the slot to form two elongated grooves, and the bumper attaching device is comprised of:

a hollow threaded member having a head at one end;

a spool threaded onto the threaded member and having longitudinally spaced apart flanges, the flanges being adapted to be received in the elongated grooves; and a locking member threaded onto the threaded member between the head and the spool.

* * * * *